US009008837B2

(12) United States Patent
Nitz et al.

(10) Patent No.: US 9,008,837 B2
(45) Date of Patent: Apr. 14, 2015

(54) METHOD FOR CREATING A ROBOT MODEL AND INDUSTRIAL ROBOT

(75) Inventors: Gernot Nitz, Augsburg (DE); Dietmar Tscharnuter, Statzling (DE); Wolfgang Michel, Mittelneuufnach (DE); Rene Rossig, Augsburg (DE); Michael Muller, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 304 days.

(21) Appl. No.: 13/508,685

(22) PCT Filed: Nov. 15, 2010

(86) PCT No.: PCT/EP2010/067495
§ 371 (c)(1),
(2), (4) Date: May 8, 2012

(87) PCT Pub. No.: WO2011/064120
PCT Pub. Date: Jun. 3, 2011

(65) Prior Publication Data
US 2012/0232694 A1    Sep. 13, 2012

(30) Foreign Application Priority Data

Nov. 24, 2009   (DE) .......................... 10 2009 054 421

(51) Int. Cl.
G06F 19/00        (2011.01)
G05B 19/401       (2006.01)

(52) U.S. Cl.
CPC .................................. *G05B 19/4015* (2013.01)

(58) Field of Classification Search
USPC ................ 701/245–264; 318/568.11–568.13, 318/568.15–568.25; 74/409, 74/490.01–490.06; 901/2–18
See application file for complete search history.

(56) References Cited

U.S. PATENT DOCUMENTS

| 4,362,977 A | 12/1982 | Evans et al. |
| 2005/0273202 A1* | 12/2005 | Bischoff ....................... 700/263 |

FOREIGN PATENT DOCUMENTS

| DE | 198 21 873 A1 | 11/1999 |
| DE | 198 26 395 A1 | 12/1999 |
| DE | 199 30 087 A1 | 1/2001 |
| DE | 10 2004 026 814 A1 | 12/2005 |
| DE | 10 2007 017 578 A1 | 10/2008 |

(Continued)

OTHER PUBLICATIONS

European Patent Office; Search Report in International Patent Application No. PCT/EP2010/067495 dated Mar. 10, 2011; 4 pages.

(Continued)

*Primary Examiner* — Khoi Tran
*Assistant Examiner* — Adam Mott
(74) *Attorney, Agent, or Firm* — Wood, Herron & Evans, LLP

(57) ABSTRACT

The invention relates to a method for creating a robot model (17) of an industrial robot (1) which has a robotic arm (2) having a plurality of successive limbs (3-8) which are adjustable by means of drives (11-16) via transmissions (5) in relation to axes (A1-A2), controlled by a control device (10) of the industrial robot (1). According to the invention, the robotic arm (2) is moved in a plurality of poses. At least one of the limbs (4) is moved in the same first movement direction (18) by means of the drive (11) thereof at least upon approaching the individual poses. In order to obtain the robot model (17), the robotic arm (2) is measured at each of the poses thereof.

9 Claims, 2 Drawing Sheets

(56) References Cited

FOREIGN PATENT DOCUMENTS

| | | |
|---|---|---|
| DE | 10 2008 060 052 A1 | 6/2010 |
| EP | 0 353 585 A2 | 2/1990 |
| EP | 1 189 121 A2 | 3/2002 |

OTHER PUBLICATIONS

German Patent Office; Office Action in German Patent No. 10 2009 054 421.6 dated Oct. 12, 2010; 5 pages.

* cited by examiner

METHOD FOR CREATING A ROBOT MODEL AND INDUSTRIAL ROBOT

The invention relates to an industrial robot and to a method of creating a robot model.

Industrial robots are work machines that can be equipped for the automatic manipulation and/or working of objects with tools and can be programmed in several movement axes, for example, regarding orientation, position and work flow. Industrial robots customarily comprise robotic arms with several sequential limbs that can be moved relative to the axes by electrical drives. The electrical drives are controlled by a programmable control (control device) of the industrial robot in order to control or regulate the courses of the movements of the industrial robot.

The electrical drives each comprise an electrical motor that is normally connected by a transmission to the relevant limb of the robotic arm.

The controls have physical models of the robot for a satisfactory control or regulation of the robots. The general spatial movements of the robot are described with a kinematic model of the robot that substantially describes the geometry of the robot without forces or moments acting on the robot. However, deformations of the robot produced by forces or moments that are also possibly load-dependent can have the result that an actual position of the robot differs from its theoretical position.

For an improved dynamic control or regulation the robot can also comprise a dynamic model that describes, taking into account properties of mass, a connection between coordinates of the robot axes, their speeds and accelerations as well as forces and moments.

In order to at least reduce the possibly occurring difference between an actual position of the robot and its theoretical position in the kinematic model, the properties of mass and elasticities of the robot can be taken into account for the static positional errors, as a result of which the absolute accuracy of the robot is improved. This can be taken into account by a so-called absolutely accurate model of the robot, i.e., a model, e.g., that takes into account static deformations that are as a rule specific to the specimen.

In the case of industrial robots poses, i.e., position and orientation in particular of its so-called tool center points (TCP) are approached in space in such a manner that the motors are driven in such a manner that a certain angular position of individual axes or limbs of the industrial robot are achieved. The motors are as a rule connected via transmissions to the limbs.

However, the positioning, i.e., the adjusting of the robotic arm in such a manner that the desired pose is approached, can occur only with a certain accuracy. This accuracy is limited, e.g., by manufacturing tolerances, the accuracy of possibly used measuring systems or also by a transmission play in the transmissions.

The invention has the problem of indicating prerequisites for creating an improved robot model in particular in order to at least reduce the effects of a transmission play.

The invention solves this problem by a method for creating a robot model of an industrial robot that comprises a robotic arm with several successive limbs that can be adjusted by drives via transmissions as regards axes by a control device of the industrial robot, comprising the following method steps:

Movement of the robotic arm into several poses, whereby at least one of the limbs is moved at least during the approach of the individual poses by its drive into the same first direction of movement, and measuring of the robotic arm in its poses in order to obtain the robot model.

Another aspect of the invention concerns an industrial robot comprising a robotic arm with several successive limbs that can be moved controlled by drives via transmissions relative to axes by a control device of the industrial robot, whereby a robot model of the industrial robot is stored in the control device which model was created in accordance with the method in accordance with the invention.

Thus, in accordance with the invention the industrial robot is brought by its drives that are in particular electrical drives into the various poses and then measured in order to obtain the robot model for the creating of the robot model, that is in particular an absolutely accurate robot model. The measuring as such is familiar to the person skilled in the art and is therefore not explained further. In order to increase the accuracy of the position upon reaching the pose, according to the invention at least one of the limbs is always moved by its drive upon approaching the individual poses in such a manner that it approaches the particular poses in the same first direction of movement. That is, during the measuring of the industrial robot it always approaches the measuring poses from a certain direction, in particular relative to the transmission associated with the relevant axis. This brings it about that a robot model can be created that is subject to a transmission play, conditioned by manufacturing tolerances, in a certain transmission direction that is associated with the first direction of movement. By using this robot model and optionally a suitable positioning strategy in which the individual positions are also always approached from the same direction of movement as during the measuring, an increased positional accuracy can then be achieved.

This positioning strategy optionally comprises a fine positioning in which it can be ensured that, for example, after the pre-positioning by a traditional path planning a fine positioning takes place if necessary, during which, for example, a relative movement is executed that is at least so large that the desired transmission flank securely comes to abut. The fine positioning can be implemented in the path planning or also be realized at a higher level.

The positioning strategy can take place in the path planning so that the user has no additional input during the start up. If necessary, this option can be cut in/cut out. The positioning strategy can also be programmed by the user in the framework of the startup, for example, by lead points.

The axis relative to which the relevant limb can be adjusted is preferably an axis of rotation relative to which the relevant limb can be rotated. Thus, for the creation of the robot model the relevant limb is rotated relative to this axis of rotation at least during the approach of the poses always relative to a first direction or rotation.

The axis of rotation about which the relevant limb can rotate is preferably or even exclusively a vertically running axis of rotation. This axis of rotation is in particular the so-called axis 1.

The robotic arm can comprise a robotic hand and the axis of rotation about which the relevant limb can rotate is a hand axis associated with the robotic hand.

The robotic arm of the industrial robot in accordance with the invention can comprise as one of the limbs a rotating shaft supported in a rotatable manner about a horizontally running axis, and can comprise as a further limb a crossbeam that is supported relative to another horizontally running axis and that is supported in such a manner that it can rotate relative to the rotating shaft. Then, the poses can either assume only a position in which the crossbeam either assumes an angular position between 0° and 180° relative to the further horizontally running axis, or assumes an angular position between 180° and 360° relative to a vertically running axis. Thus, according to this variant the influence of the other vertically running axis can be taken into consideration for the robot model. The horizontally running axis can also be optionally designated as axis 2 and another horizontally running axis can also be optionally designated as axis 3. The vertically running axis is optionally the so-called axis 1 if the rotating shaft is rotatably supported, relative to its horizontally running axis, on a roundabout rotary platen that is rotatably supported relative to the vertically running axis.

According to an embodiment of the method in accordance with the invention this method has the following additional method steps:

movement of the robotic arm into several other poses, whereby at least one of the limbs is moved, at least during the approach to the individual other poses, in the same second direction of movement by its drive which direction of movement is opposite to the first direction of movement, and measuring of the robotic arm in its other poses in order to obtain another robot model of the industrial robot.

Thus, two robot models are created that are in particular absolutely accurate robot models in which, as a function of the direction of movement, in the case of an axis of rotation as the relevant axis a transmission play of the associated transmission is also taken into consideration in accordance with the direction of rotation of the corresponding limb. According to this variant, therefore, two different data records are recorded for the relevant axis, in particular for the axis 1. It is then possible during the operation of the industrial robot in accordance with the invention that upon reaching a position in the direction of the first direction of movement, optionally in the direction of the first direction of rotation for the control or regulation of the industrial robot, the robot model is used, and for the opposite direction of movement or direction of rotation, the other robot model or the corresponding data records are used for the relevant axis. During the operation of the industrial robot it is possible to switch back and forth between the two robot models based on a path planning associated with the movement since it is known from the path planning from which direction the relevant axis moves into its end position.

Data records that are different can optionally also be used for further axes, in particular for the so-called axes 2 and 3, but also for the axes of the robotic hand, the so-called hand axes.

If the robotic arm of the industrial robot in accordance with the invention comprises as one of the limbs the rotating shaft rotatably supported around the horizontally running axis, and as another limb the crossbeam that is supported relative to the other horizontally running axis and is rotatably supported relative to the rotating shaft, it can then be provided for the robot model that the crossbeam is allowed to assume either only in a position in which the crossbeam assumes, relative to the other horizontally running axis, an angular position between 0° and 180° relative to the vertically running axis or an angular position between 180° and 360° relative to the vertically running axis, and for the other robot model the crossbeam is allowed to assume the opposite position.

Another aspect of the invention relates to a method for planning a path of an industrial robot that comprises a robotic arm with several successive limbs that can be moved by a control device of the industrial robot controlled by drives via transmissions with regard to axes, and that a robot model of the industrial robot is stored in the control device which model was created in accordance with the method of the invention and comprises the planning of a path of the industrial robot to be carried out based on the robotic model, whereby the robotic arm should be moved into poses in such a manner that at least the relevant limb of the limbs is moved at least during the approach of the individual poses relative to its axis into the same first direction of movement by its drive. If the other robot model is also recorded in the control device, then the path of the industrial robot to be carried out can be planned in such a manner that the planning of the path to be carried out is based on the robotic model or on the other robotic model as a function of with which direction of movement of the relative limb of the limbs a pose is approached.

An exemplary embodiment of the invention is shown by way of example in the attached schematic drawings, in which:

FIG. 1 shows a perspective view of an industrial robot 1 with a robotic arm 2.

Figure 1:
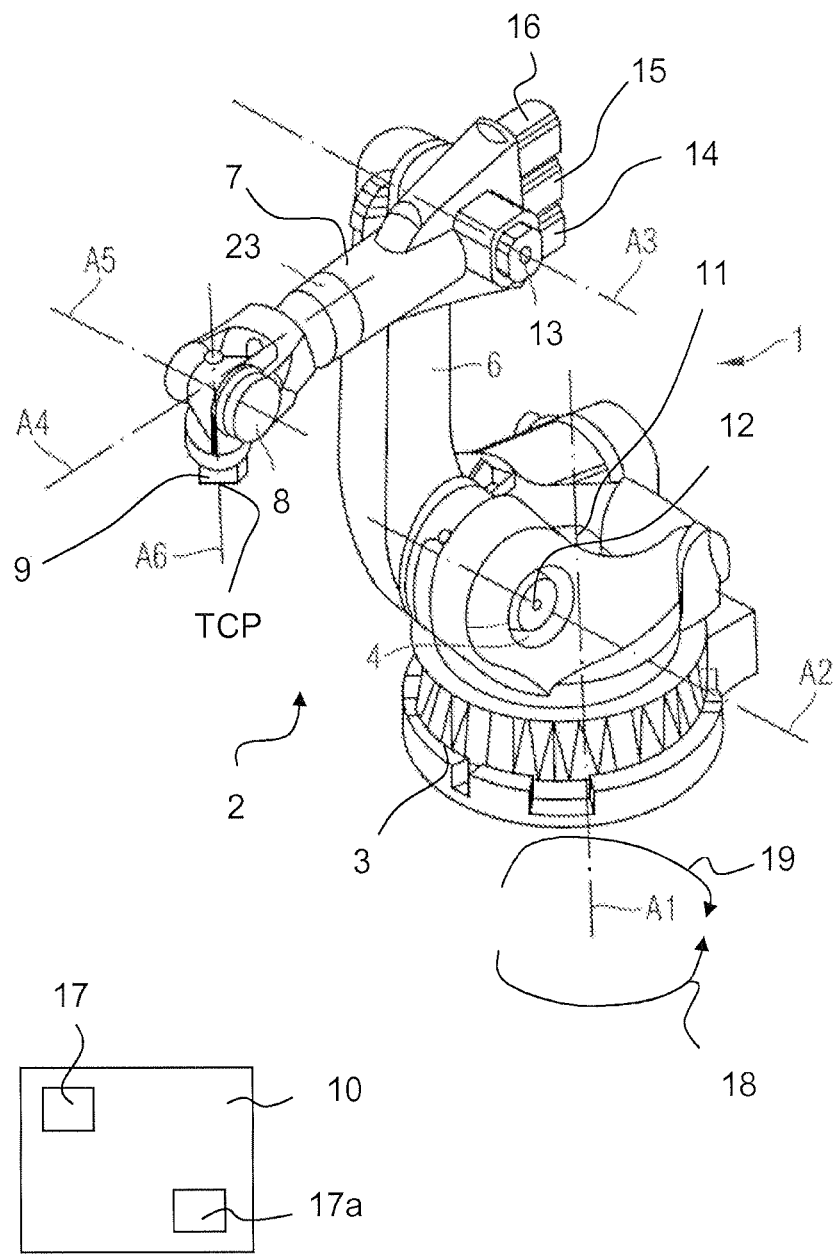
FIG. 1 shows in industrial robot.

The robotic arm 2 comprises in the case of the present exemplary embodiment several successively arranged limbs and/or segments connected by articulations. The limbs are in particular a stationary or movable frame 3 and an axis A1 that is also designated as axis 1 and runs vertically relative to the frame 3, a rotatably mounted roundabout rotary platen 4. Other limbs of the robotic arm 2 are in the case of the present exemplary embodiment a rotating shaft 6, a crossbeam 7 and a preferably multi-axis robotic hand 8 with a flange 9. The rotating shaft 6 is supported at the lower end, e.g., on a rotating shaft support head (not shown in detail) on the roundabout rotary platen 4 in such a manner that it can pivot about a preferably horizontal axis A2 that is also designated as axis 2. Again, the crossbeam 7 is supported at the upper end of the rotating shaft 6 in such a manner that it can pivot about a likewise preferably horizontal axis A3, that is also designated as axis 3. This crossbeam 7 carries on its end the robotic hand 8 with its preferably three axes A4, A5, A6.

Figure 2:
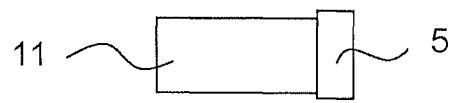
FIG. 2 shows a transmission coupled to an electrical motor.

In order to move the industrial robot 1 and its robotic arm 2 it comprises in a generally known manner drives that are connected to a control device 10 and are in particular electrical drives. The electrical motors 11-16 of the drives are connected via transmissions to their limbs in order that the latter can be rotated about the axes A1-A6. FIG. 2 shows by way of example the motor 11 with its transmission 5 associated with it.

In the case of the present exemplary embodiment the motor 11 is provided for rotating the roundabout rotary platen 4 relative to the axis A1 via the transmission 5, the motor 12 is provided for rotating the rotating shaft 6 relative to the axis A2, the motor 13 is provided for rotating the crossbeam 6 relative to the axis A3 and the motors 14-16 are provided for rotating the limbs of the robotic hand 8 relative to the axes A4-A6.

A calculating program runs in the control device 10 on the basis of which a movement of the robotic arm 2, in particular the flange 9 of the robotic arm or of the so-called Tool Center Points TCP executes a given movement. In order to obtain at least a satisfactory actual movement and/or in order that the flange 9 with the TCP assumes a desired pose, i.e., position and orientation, the control device 10 and/or the calculating program running in it controls the electrical drives in such a manner that the robotic arm 2 assumes an axial position corresponding to the desired pose of the Tool Center Points TCP.

In order to be able to carry out this movement at least satisfactorily, a robot model 17 of the industrial robot 1 is stored in the control device 10. The robot model 17 is in particular an absolutely accurate robot model of the industrial robot 1 and models at least the axial positions to several desired poses of the Tool Center Points TCP.

In the case of the present exemplary embodiment the robot model 17 is created as follows:

At first the robotic arm 2 is brought, e.g., by an input device (not shown in detail) and by its drives into a first axial position so that the Tool Center Point TCP assumes a given pose. At least one of the limbs of the robotic arm 2 is moved at least during the approach of this position relative to a first direction of movement 18. In the case of the present exemplary embodiment the limb that is moved at least during the approach of the pose relative to the first direction of movement is the roundabout rotary platen 4, so that at least during the approach of this pose the roundabout rotary platen 4 is rotated relative to its axis A1 relative to the first direction of movement 18.

If the industrial robot 1 has assumed its axial position associated with the pose, the robotic arm 2 is measured by a measuring system that is not shown in detail but is known to the person skilled in the art in order to obtain the robot model 17 for this axial position associated with the pose.

This is repeated at least once or even frequently, i.e., the robotic arm 2 is subsequently brought by the input device (not shown) into at least one further axial position so that the Tool Center Point TCP assumes another pose associated with the other axial position or other poses associated with the axial positions. At least one of the limbs of the robotic arm 2 is moved at least during the approach of this pose or these poses relative to the first direction of movement 18. Therefore, in the case of the present exemplary embodiment the roundabout rotary platen 4 is rotated about its axis A1 in such a manner at least during the approach of this pose or of these poses so that at least during the approach of the pose or poses the roundabout rotary platen 4 is rotated relative to its axis A1 relative to the first direction of movement 18.

The robotic arm 2 is subsequently measured again in order to obtain the robot model 17 for this axial position or these axial positions.

It can also be provided in the case of the present exemplary embodiment that the robotic arm 2 is operated in such a manner for the creation of the robotic model 17 that in order to assume the poses the crossbeam 7 assumes, relative to the axis A3 by means of which the crossbeam is supported in such a manner that it can rotate relative to the rotating shaft 6, either an angular position between 0° and 180° or an angular position between 180° and 360° relative to the vertically running axes A1 relative to which the roundabout rotary platen 4 is rotatably mounted.

In the case of the present exemplary embodiment a path planning program is stored on the control device 10 for a path on which the industrial robot 1 is to move and optionally align the tool Center Point TCP during a movement. This program executes the following path planning method:

The path of the industrial robot 1 to be carried out is planned based on the robot model 17. The robotic arm 2 is moved virtually into poses here in such a manner that at least the roundabout rotary platen 4 is moved at least during the approach of the individual poses relative to its axis A1 in the same first direction of movement 18 by its drive 11. Thus, even during the subsequent operation of the industrial robot 1 at least the roundabout rotary platen 4 is moved during the approach of the individual poses relative to its axis A1 in the same first direction of movement 18 by its drive 11.

If necessary, the crossbeam 17 is aligned in such a manner that it assumes the corresponding angular position associated with the robot model 17.

In the exemplary embodiment described at least the roundabout rotary platen 4 is moved relative to its axis A1 at least during the approach of poses relative to the first direction of movement 18. In principle, the described methods can also be used for other limbs, in particular for the rotating shaft 6 and/or the crossbeam 7.

It can also be provided that another robot model 17a is stored in the control device 10 of the industrial robot 1 that was created in that the robotic arm 2 was moved into several other poses, whereby at least one of the limbs, in the case of the present exemplary embodiment the roundabout rotary platen, 4, is moved by its drive, at least during the approach of the individual other poses, in the same second direction of movement 19 opposed to the first direction of movement 18. The robotic arm 2 is subsequently measured in its further poses in order to obtain the other robot model 17a from the industrial robot 1.

If the control device 10 comprises the two robot models 17, 17a, then in the case of the present exemplary embodiment the path is planned by the following modified plan planning method in that during the approach of a desired pose either the robot model 17 or the robot model 17a is returned to, as a function of the direction of rotation and/or direction of movement 18, 19 of the roundabout rotary platen 4.

Thus, even during the subsequent operation of the industrial robot 1 at least the roundabout rotary platen 4 is moved by its drive, at least during the approach of the individual poses, relative to its axis A1 in accordance with the planning in the first direction of movement 18 or in the second direction of movement 19.

The invention claimed is:

1. A method for creating a robot model of an industrial robot that comprises a robotic arm with several successive links that can be adjusted about respective axes by drives connected to the links by transmissions and controlled by a control device of the industrial robot, comprising the following method steps:
   moving the robotic arm into several poses, wherein, for each pose, at least one of the links is moved by its respective drive in a first direction of movement, at least during the approach of the pose,
   measuring the robotic arm in the respective poses in order to obtain a first robot model,
   moving the robotic arm into several additional poses, wherein, for each additional pose, at least one of the links is moved by its respective drive in a second direction of movement, at least during the approach to the additional poses, wherein the second direction of movement is opposite to the first direction of movement, and
   measuring the robotic arm in the respective additional poses in order to obtain a second robot model of the industrial robot.

2. The method according to claim 1, in which the robot model is an absolutely accurate robot model and/or the axis relative to which the relevant link can be adjusted is an axis of rotation relative to which the relevant link can rotate.

3. The method according to claim 2, in which the axis of rotation about which the relevant link can rotate is a vertically extending axis of rotation.

4. The method according to claim 2, in which the robotic arm comprises a robotic hand and the axis of rotation about which the relevant link can rotate is a hand axis associated with the robotic hand.

5. The method according to claim 1, wherein the links of the robotic arm include a shaft rotatably supported about a first horizontally extending axis, and a crossbeam that is rotatably supported about a second horizontally extending axis such that the crossbeam can rotate relative to the rotating shaft, and wherein moving into the several poses comprises moving the crossbeam to one of an angular position between 0 degrees and 180 degrees relative to the second horizontally extending axis, or an angular position between 180 degrees and 360 degrees relative to a vertically extending axis.

6. A method for planning a path of an industrial robot that comprises a robotic arm with several successive links that can be moved by a control device of the industrial robot controlled by drives via transmissions with regard to axes, and having first and second robot models of the industrial robot stored in the control device which models were created in accordance with the method according to claim 1, the method comprising:

planning a path of the industrial robot to be carried out, whereby the planning of the path to be carried out is based either on the first robot model or on the second robot model as a function of with which direction of movement of the relevant link a pose is approached.

7. An industrial robot that comprises a robotic arm with several successive links that can be moved by a control device of the industrial robot controlled by drives via transmissions with regard to axes, whereby a robot model of the industrial robot is stored in the control device which model was created in accordance with the method according to claim 1.

8. The industrial robot according to claim 7, in which the robot model is an absolutely accurate robot model and/or in which the axis, in regard to which the relevant link can be adjusted, is an axis of rotation, in regard to which the relevant link can rotate.

9. The method of claim 6, wherein:

the industrial robot comprises a carousel that is rotatable about a first axis and upon which the other links of the robot are supported; and wherein planning the path based on the first robot model or the second robot model is determined based on the direction a pose of the robot is approached by rotation of the carousel about the first axis.

\* \* \* \* \*